US009665458B2

(12) United States Patent
Stevenson et al.

(10) Patent No.: US 9,665,458 B2
(45) Date of Patent: May 30, 2017

(54) METHOD AND SYSTEM FOR PROVIDING INFORMATION FROM THIRD PARTY APPLICATIONS TO DEVICES

(75) Inventors: Thomas Edward Stevenson, St. Michaels, MD (US); Allan Michael Matyger, Jr., Middletown, DE (US); Paul Smith, Wilmington, DE (US); Sean Sachen, Tarpon Springs, FL (US)

(73) Assignee: Data Security Solutions, LLC, Newark, DE (US)

( * ) Notice: Subject to any disclaimer, the term of this patent is extended or adjusted under 35 U.S.C. 154(b) by 0 days.

(21) Appl. No.: 13/486,133

(22) Filed: Jun. 1, 2012

(65) Prior Publication Data

US 2013/0007836 A1    Jan. 3, 2013

Related U.S. Application Data

(60) Provisional application No. 61/492,199, filed on Jun. 1, 2011.

(51) Int. Cl.
*H04L 29/06* (2006.01)
*G06F 11/30* (2006.01)
*G06F 21/56* (2013.01)

(52) U.S. Cl.
CPC ........ *G06F 11/3072* (2013.01); *G06F 21/566* (2013.01); *H04L 63/0227* (2013.01); *H04L 63/1425* (2013.01)

(58) Field of Classification Search
CPC .......................... H04L 63/0227; H04L 63/1425
USPC ........................................................... 726/1
See application file for complete search history.

(56) References Cited

U.S. PATENT DOCUMENTS

| | | | |
|---|---|---|---|
| 5,876,240 A | 3/1999 | Derstine et al. | |
| 5,958,012 A | 9/1999 | Battat et al. | |
| 5,991,881 A | 11/1999 | Conklin et al. | |
| 6,289,380 B1 | 9/2001 | Battat et al. | |
| 6,493,755 B1 | 12/2002 | Hansen et al. | |
| 7,003,587 B1 | 2/2006 | Battat et al. | |
| 7,093,292 B1 | 8/2006 | Pantuso | |
| 7,143,439 B2 * | 11/2006 | Cooper et al. .................. | 726/11 |

(Continued)

FOREIGN PATENT DOCUMENTS

| | | |
|---|---|---|
| WO | WO-03-098413 | 11/2003 |
| WO | WO 2005/026872 | 3/2005 |

OTHER PUBLICATIONS

Written Opinion issued in International Application No. PCT/US2012/040441, dated Dec. 26, 2012.

(Continued)

*Primary Examiner* — Longbit Chai
(74) *Attorney, Agent, or Firm* — DLA Piper LLP US

(57) ABSTRACT

A method and system of making information from an application accessible to an electronic device, comprising: checking, via a log monitor, a third party log file for a new log entry; sending any new log entries in the third party log file to a rules engine, the rules engine comprising at least one rule; determining if any of the new log entries violate any rules in the rules engine; making accessible any new log entries that violate any rules to the electronic device; creating an alert based on the new log entry that violates at least one rule; and notifying users of the alert using alert criteria to determine who should receive the alerts and when, wherein different users receive different alerts based on the alert criteria.

20 Claims, 14 Drawing Sheets

(56) References Cited

U.S. PATENT DOCUMENTS

| | | |
|---|---|---|
| 7,152,242 B2 | 12/2006 | Douglas |
| 7,246,156 B2 | 7/2007 | Ginter et al. |
| 7,278,160 B2 * | 10/2007 | Black et al. ............... 726/23 |
| 7,315,893 B2 | 1/2008 | Vinberg |
| 7,342,581 B2 | 3/2008 | Vinberg |
| 7,376,969 B1 | 5/2008 | Njemanze et al. |
| 7,594,009 B2 | 9/2009 | Triulzi et al. |
| 7,653,633 B2 | 1/2010 | Villella et al. |
| 7,680,879 B2 | 3/2010 | Battat et al. |
| 7,693,941 B2 | 4/2010 | Battat et al. |
| 7,779,119 B2 | 8/2010 | Ginter et al. |
| 7,962,957 B2 * | 6/2011 | Keohane et al. ............. 726/23 |
| 8,032,489 B2 | 10/2011 | Villella et al. |
| 8,291,324 B2 | 10/2012 | Battat et al. |
| 8,677,487 B2 * | 3/2014 | Balupari ............ G06F 21/552 726/22 |
| 2002/0013837 A1 | 1/2002 | Battat et al. |
| 2002/0138602 A1 | 9/2002 | Vinberg |
| 2002/0147809 A1 | 10/2002 | Vinberg |
| 2003/0018771 A1 | 1/2003 | Vinberg |
| 2003/0023721 A1 | 1/2003 | Vinberg |
| 2003/0023722 A1 | 1/2003 | Vinberg |
| 2003/0033402 A1 | 2/2003 | Battat et al. |
| 2003/0088663 A1 | 5/2003 | Battat et al. |
| 2005/0038888 A1 | 2/2005 | Labertz |
| 2006/0143239 A1 | 6/2006 | Battat et al. |
| 2006/0236395 A1 | 10/2006 | Barker et al. |
| 2007/0033279 A1 | 2/2007 | Battat et al. |
| 2007/0039049 A1 | 2/2007 | Kupferman et al. |
| 2007/0075992 A1 | 4/2007 | Battat et al. |
| 2007/0132760 A9 | 6/2007 | Vinberg |
| 2007/0192863 A1 | 8/2007 | Kapoor et al. |
| 2007/0283194 A1 | 12/2007 | Villella et al. |
| 2009/0287603 A1 | 11/2009 | Lamar, III et al. |
| 2010/0211826 A1 | 8/2010 | Villella et al. |
| 2010/0251370 A1 | 9/2010 | Sun et al. |

OTHER PUBLICATIONS

International Preliminary Report on Patentability issued in International Application No. PCT/US2012/040441, dated Sep. 26, 2013.
International Search Report issued in international Application No. PCT/US2012/040441, dated Dec. 26, 2012.
SourceFire, White Paper, "The Case for the Next-Generation IPS" (2011) (7 pages).
SourceFire, White Paper, "Amplify Your Security to Fight Advanced Malware" (2012) (6 pages).
Neil MacDonald, "The Future of Information Security is Context Aware and Adaptive", Gartner RAS Core Research Note G00200385, pp. 1-8, May 14, 2010, (available at www.bytes.co.uk/download_file/view/904/531/).
SourceFire, "Sourcefire Next-Generation Firewall", 2011 (5 pages).
Vern Paxson, "Bro: A System for Detecting Network Intruders in Real-Time", Computer Networks, vol. 31, Issues 23-24, pp. 2435-2463, Dec. 14, 1999.
Guofei Gu et al., "BotSniffer: Detecting Botnet Command and Control Channels in Network Traffic", In Proceedings of the 15th Annual Network and Distributed System Security Symposium (NDSS'08), Feb. 2008 (18 pages).

* cited by examiner

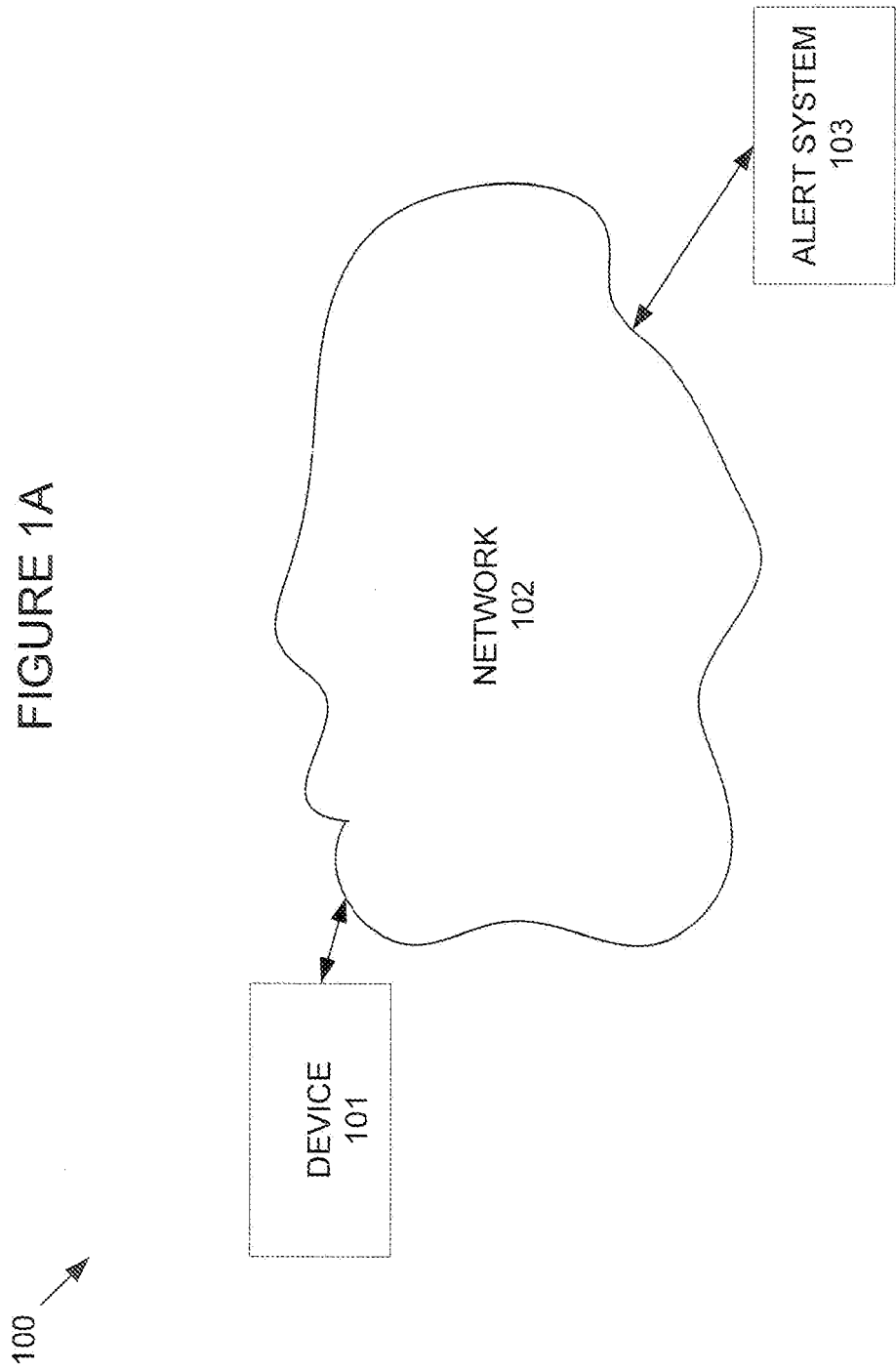

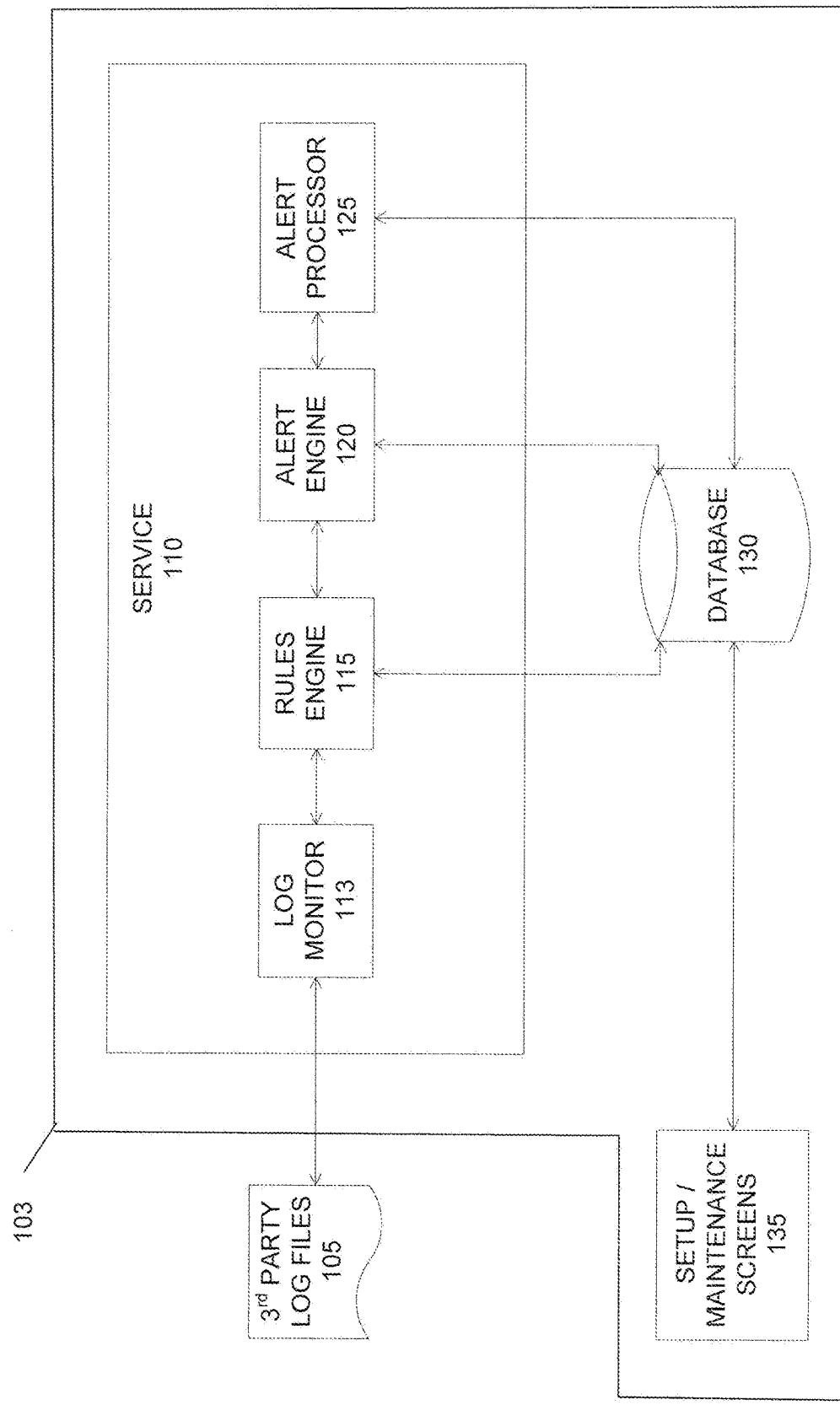

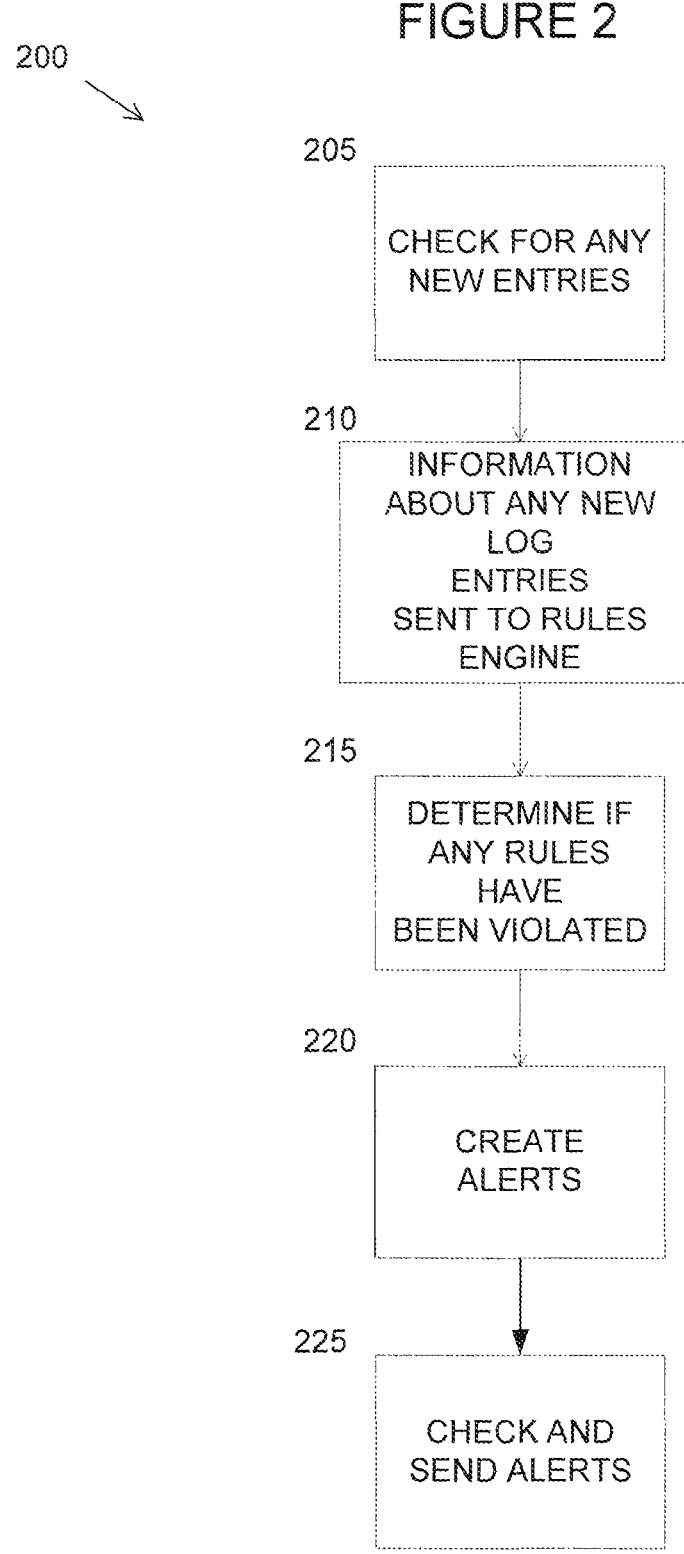

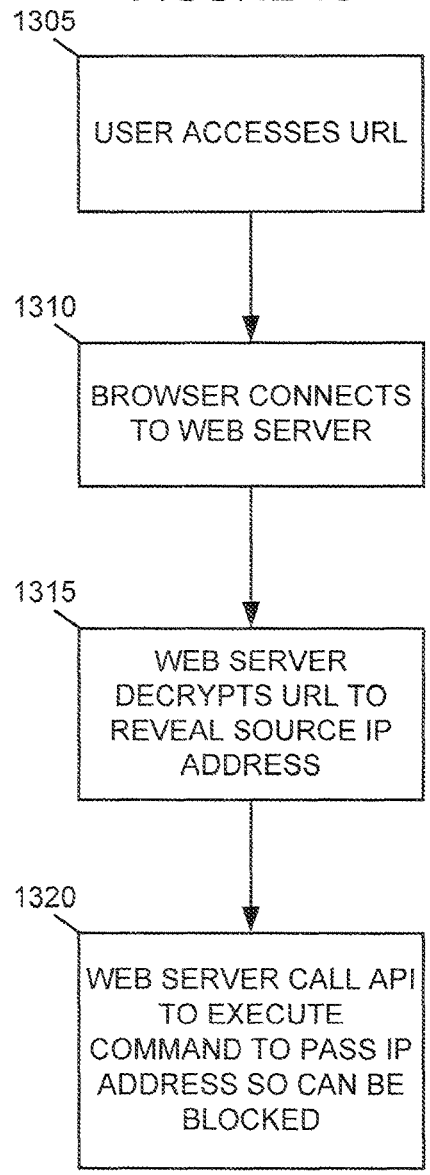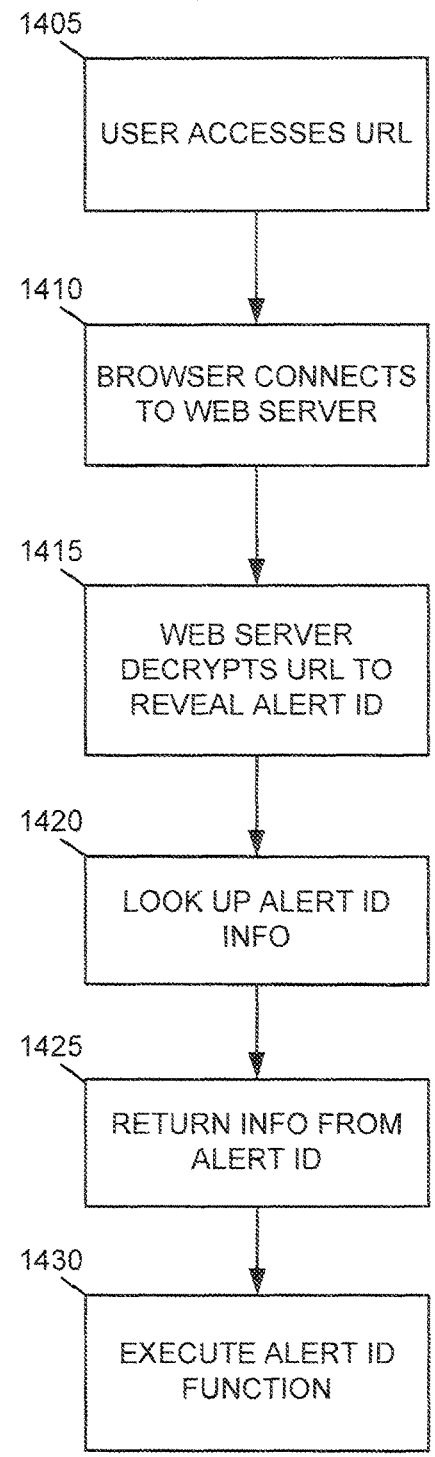

METHOD AND SYSTEM FOR PROVIDING INFORMATION FROM THIRD PARTY APPLICATIONS TO DEVICES

CROSS REFERENCE TO RELATED APPLICATIONS

This application claims the benefit of U.S. Provisional Application No. 61/492,199, filed Jun. 1, 2011, which is incorporated by reference in its entirety.

BRIEF DESCRIPTION OF THE DRAWINGS

FIG. 1A illustrates an example system 100 for providing information from third party applications to devices, according to one embodiment.

FIG. 1B illustrates details of an example alert system 103, according to one embodiment.

FIG. 2 illustrates an example method 200 for providing information from other applications to electronic devices, according to one embodiment.

FIG. 13 illustrates an example blocking mechanism, according to an embodiment.

FIG. 14 illustrates an example mechanism that uses an alert to perform a function(s), according to an embodiment.

DETAILED DESCRIPTION OF EMBODIMENTS

Figure 3:
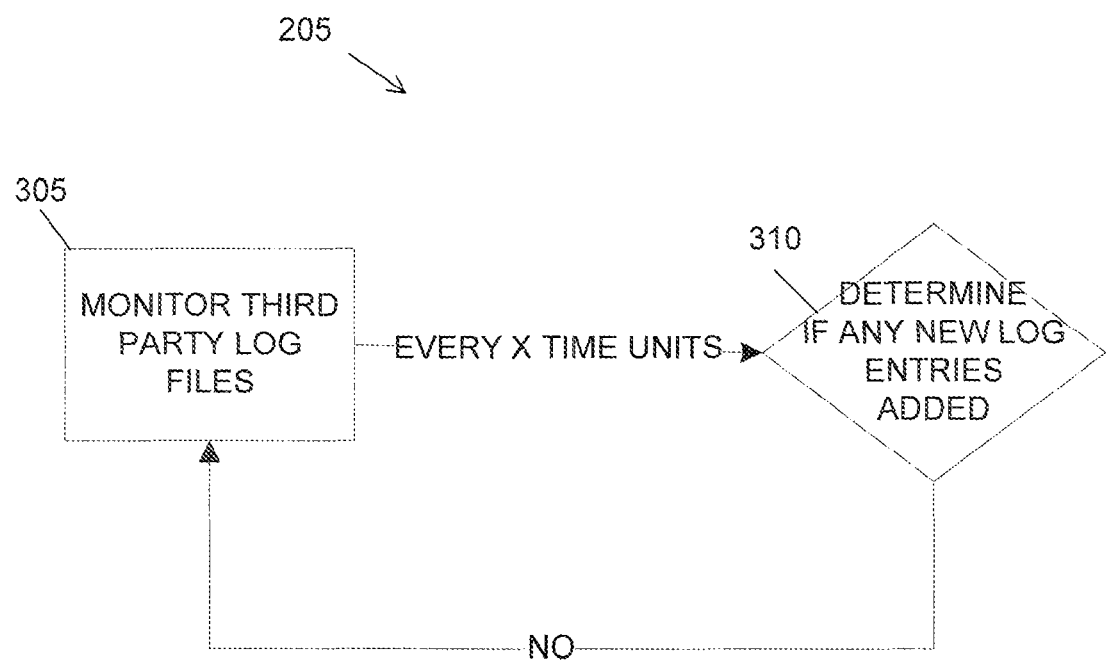
FIG. 3 illustrates an example process 205 for checking third party log files, according to one embodiment.

FIG. 1A illustrates a system 100 for providing information from third party applications to devices, according to one embodiment. Consistent with the innovations here, such system 100 may include, but is not limited to a device 101, a network 102, and an alert system 103. Here, for example, the device 101 may comprise, though is not limited to, any mobile device (e.g., pager, personal digital assistant, phone, i-phone, etc.) and/or any non-mobile device (e.g., personal computer, lap-top computer, etc). The electronic device 101 may utilize a user interface that displays information received from the alert system 103. Additionally, the network 102 may include, but is not limited to the Internet and/or an intranet.

FIG. 1B illustrates details of the alert system 103, according to one embodiment. The alert system 103 may include, though is not limited to a service 110, setup/maintenance screens 135, and/or a database 130. The alert system 103 may access a third party log file 105, which may be a record of all system exceptions, anomalies, events, etc., tracked by a third-party application. In certain embodiments, this information is recorded chronologically. The service 110 may be a platform or component that includes, though is not limited to, a log monitor 113, a rules engine 115, an alert engine 120, and/or an alert processor 125.

According to some embodiments, the log monitor 113 is configured to monitor the third party log files 105 from third party applications. Here, the third party applications may include any application that runs on a computer, including, but not limited to, a web server application firewall (e.g., DOTDEFENDER), a personal computer firewall (e.g., MCAFEE, TREND MICRO), a computer operating system (e.g., MS WINDOWS), parental control software (e.g., WEBWATCHER, CONTENT PROTECT), an automated teller machine (e.g., NCR, Triton), a server system (e.g., MS IIS, MS SQL), or any combination(s) thereof. The log monitor 113 may also be programmed to check the third party log files 105 for one or more new log entries every predetermined time unit (e.g., a predetermined time interval X, such as one second, thirty seconds, one hour, one day, one week). Here, the time unit may be configured by the user and/or by a computer. If any new log entries are found by the log monitor 113 when checking the third party log file 105, the new log entry information may then be sent to the rules engine 115 for processing. If no new log entries are found, the log monitor 113 may wait for the next time unit to check again for new log entries.

According to some implementations, the rules engine 115 remains in a sleep state until a new log entry is passed to it. Once a new log entry is received, the rules engine 115 may be configured to check the new log entry against each active rule in the database 130 that includes filtration criteria. An active rule may be defined as a record in a rule table of the database 130 that contains at least one of the filtration criteria. In one embodiment, the filtration criteria may include, though are, not limited to, one or more of the following: type of event, severity of event, velocity of event, source of event, or any combination thereof. If information regarding any new log entry meets the predefined filtration criteria, the information for that new log entry may be passed to the alert engine 120.

The alert engine 120 may be configured to create alerts and add alerts to an alert queue. Finally, an alert processing component 125 may be configured to check the alert queue for available alerts and process any available alerts.

Figure 8:
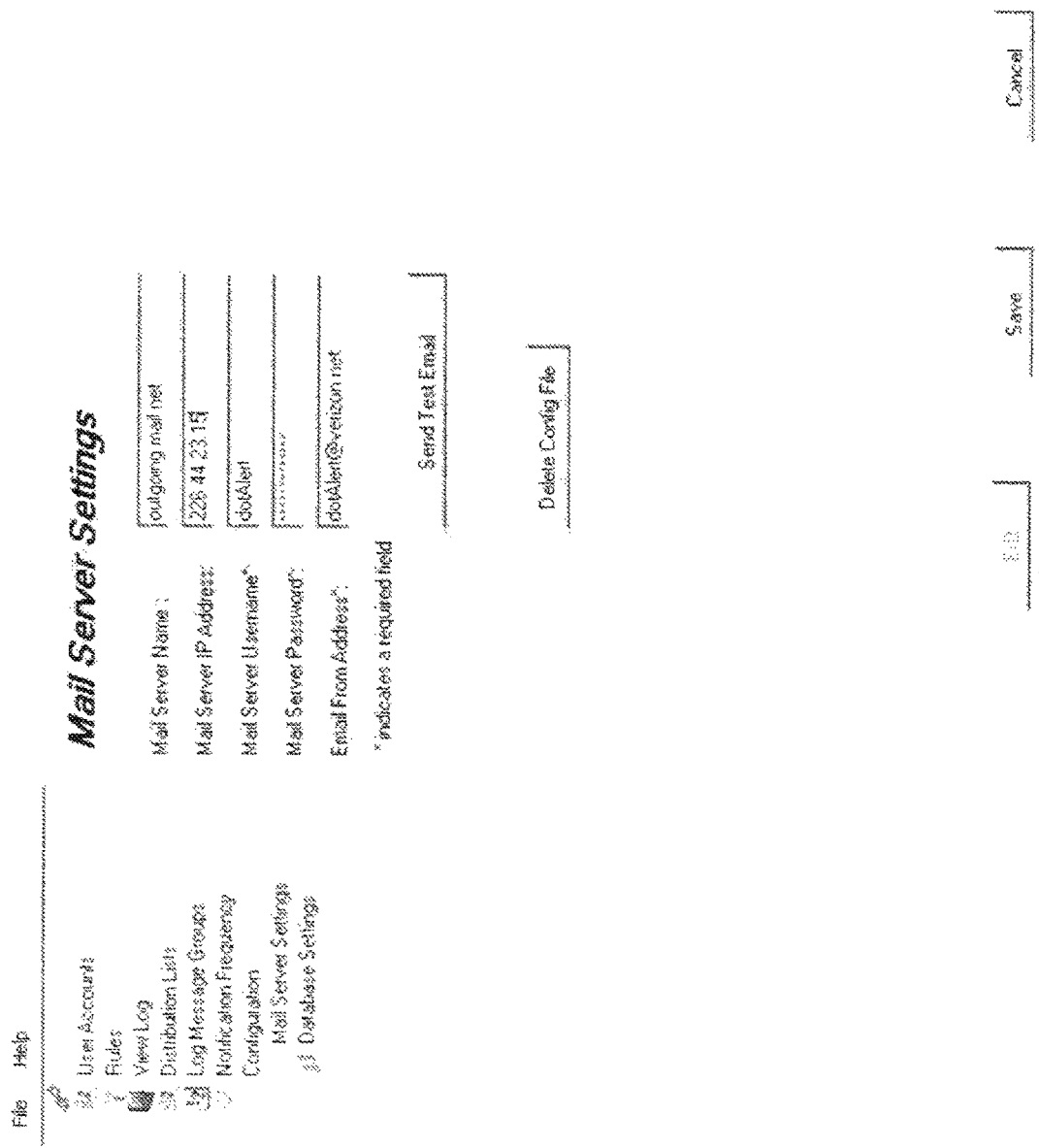
FIG. 8-11 are example screen shots with may be utilized in one embodiment of the invention.
Figure 9:
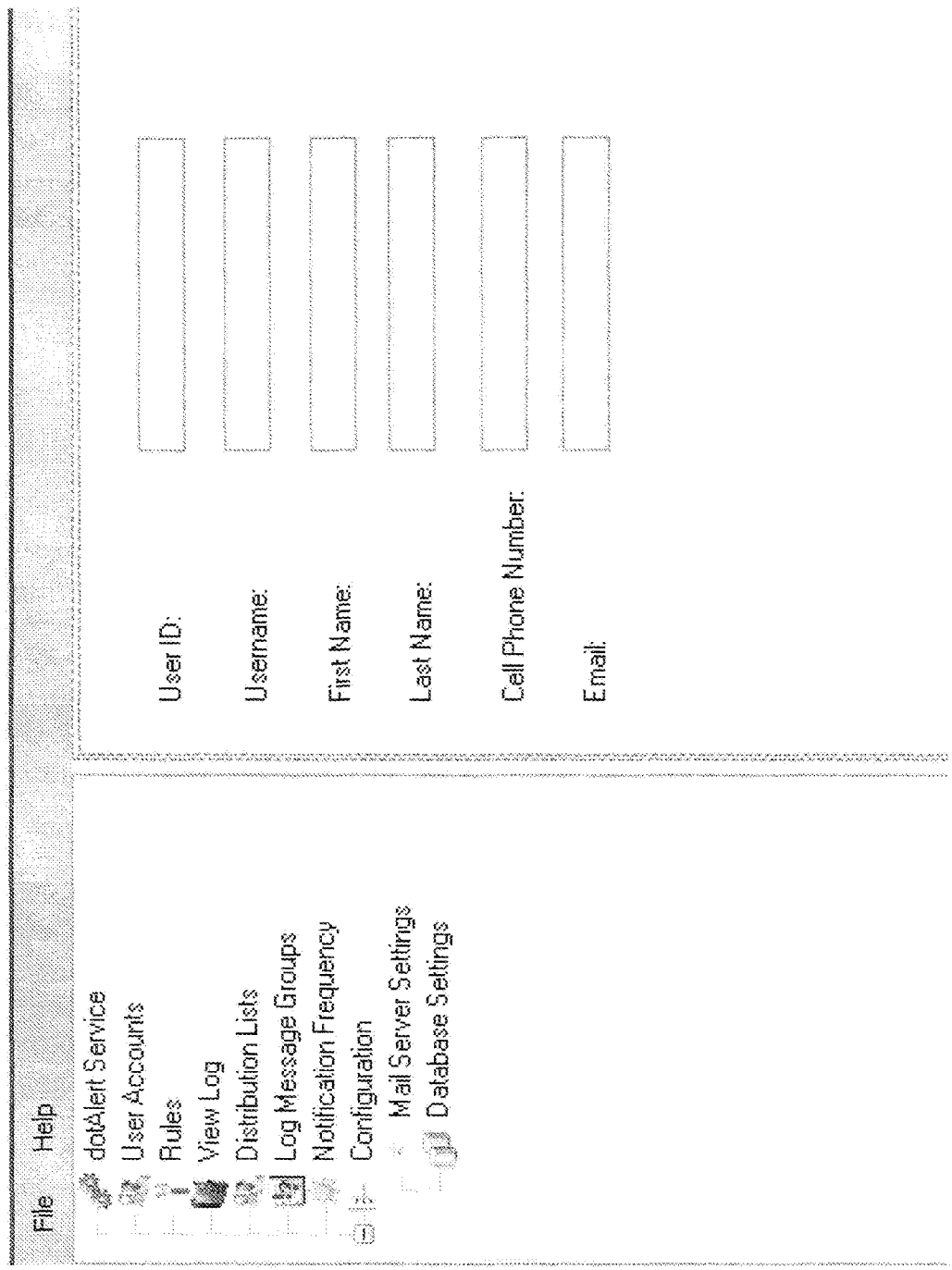
Figure 10:
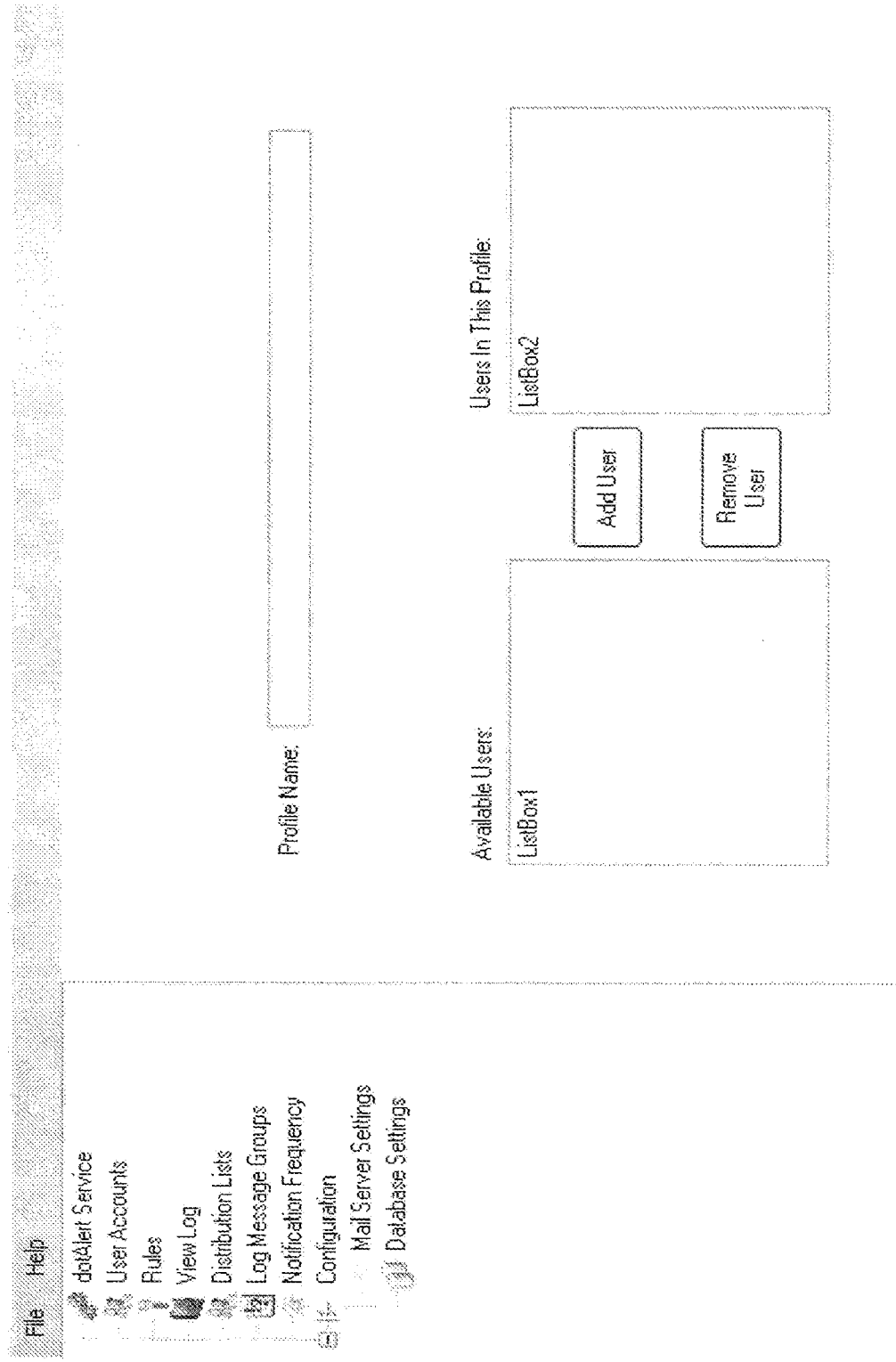
Figure 11:
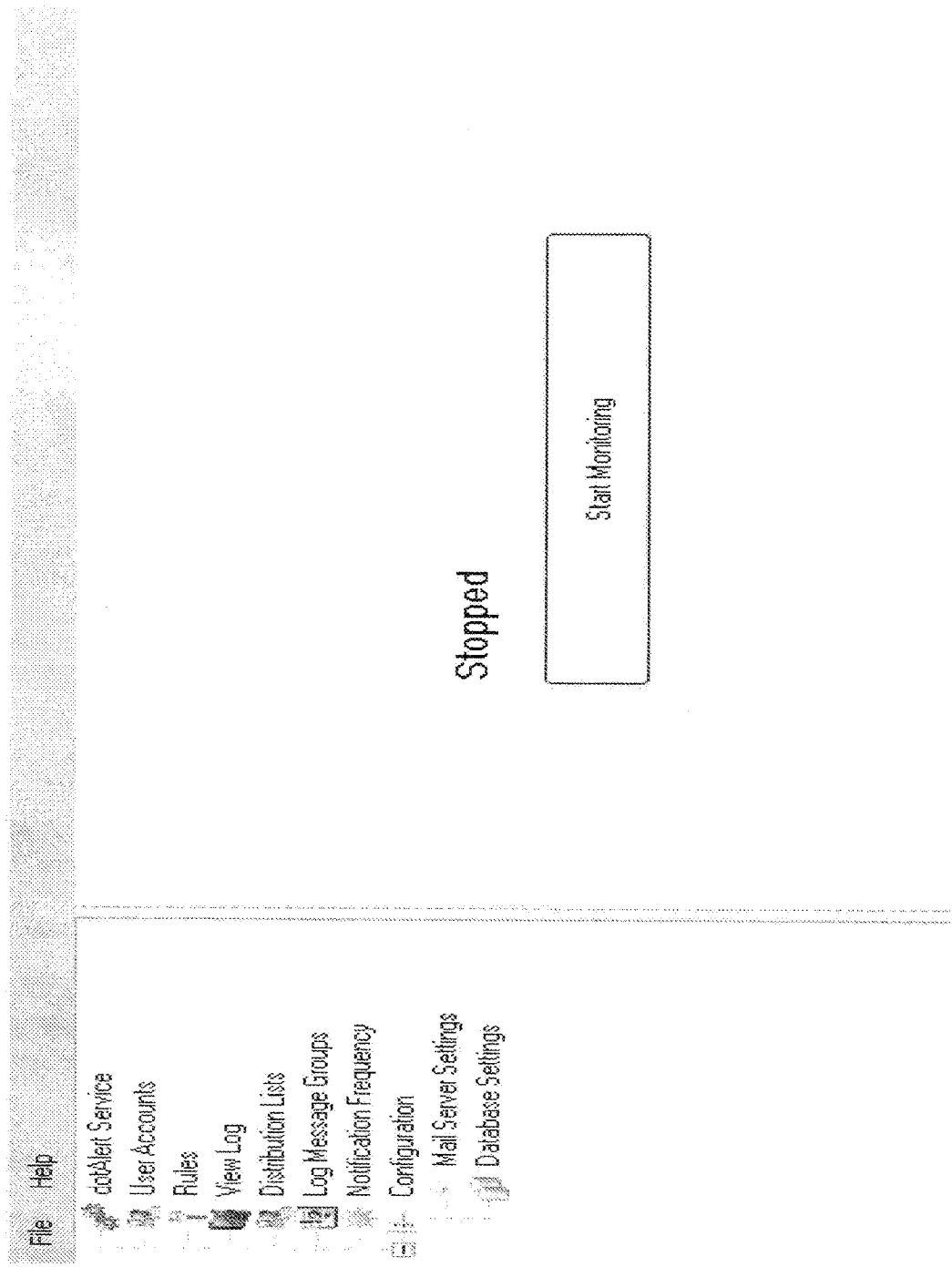

The alert system 103 of FIG. 1B may also include setup/maintenance screens 135, which may be used to setup user profiles, rules, mail sever information, roles, and other configuration information. FIGS. 8-11 are example setup/maintenance screen 135. FIG. 8 is an example mail server setup screen that may be used to set up the mail server that alert system 103 may use to send alerts. The user may set mail server settings before any alerts can be sent. Any or all of the mail server name, mail server IP address, mail server username, mail server password, and email address may be entered. FIG. 9 is an example user setup screen that can be used to set up new users in the system. A user may be any contact who will receive alerts. Any or all of the user ID, username, first name, last name, cell phone number, and email address may be entered. FIG. 10 is an example profile setup screen that may be used to set up profiles. A profile may be a list of users. The profiles may allow alerts to easily be configured to be sent to multiple users in a group. In order for a user to be added to a profile, the user may be first set up using the user set up screen. Once the user is set up, the user can be added to one or more profiles. Alerts may then be configured to go to certain profiles and/or individual users. FIG. 11 is an example service control screen, which may be used to manually start and stop the alert system 103.

If the button displays "start monitoring", then the alert system 103 is in a stopped state. Clicking the button will start the service. If the button displays "stop monitoring", then the alert system 103 is in a running state. Clicking the button will then stop the service.

Figure 7:
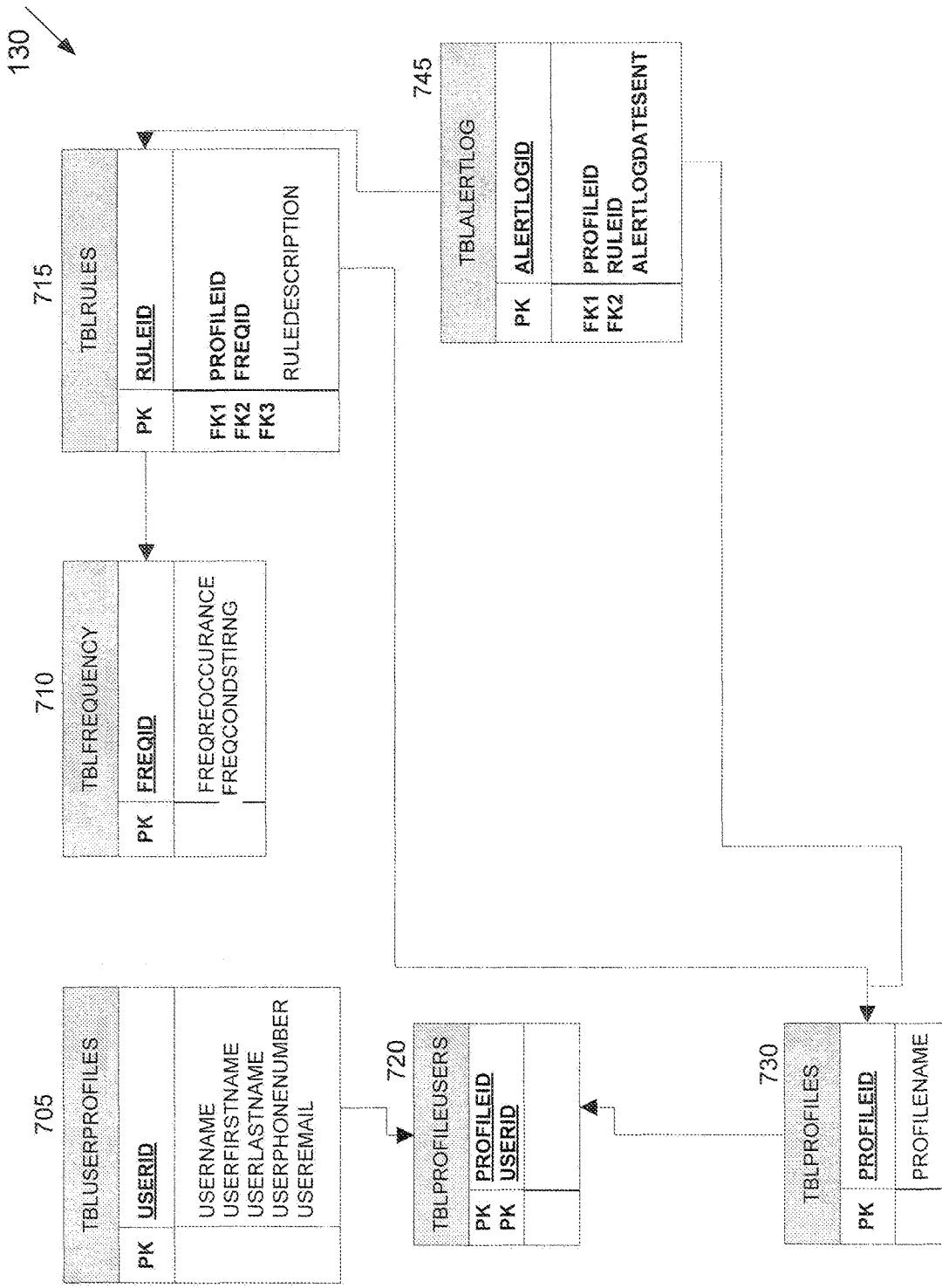
FIG. 7 illustrates an example table diagram with relationships of the system SQL database 130, according to one embodiment.

One or more databases 130 present in or associated with the alert system environment may include multiple types of data utilized by the service 110 and the setup-maintenance screens. One embodiment of an example database 130 is described in more detail in FIG. 7. FIG. 7 is a block diagram showing various illustrative tables and associated relationships within the database 130, according to one embodiment. Here, for example, a table of user profiles (tblUserProfiles) 705 may be used to store the users and their contact information, which may include, though is not limited to: a username, a user first name, a user last name, a user phone number, or a user email, or any combination thereof. One example use of this user profile information is discussed in more detail below with respect to 510 of FIG. 5. A frequency table (tblFrequency) 710 may be used to store an increment counter variable (frequcondstring), discussed in more detail below, for example, with respect to 430 of FIG. 4. This increment counter variable may store, for example, information about when to check which of multiple criteria each new log entry meets. The increment counter variable information may include, for example, information about the frequency of occurrence (e.g., how often to check). Further, a rules table (tblRules) 715 may be used to store information about various rules, as discussed above with respect to the rules engine 115. This information may include, for example, the profile ID of the rule, a frequency ID of the rule (e.g., which may be a unique number assigned to identify a particular frequency), and a description of the rule. A user profile table (tblProfileUsers) 720 may also be included to build groups of users to be notified by the alert engine 510. The groups of users may include, for example, information on the profile ID of the users and the user IDs of the users. Moreover, another profiles table (tblProfiles) 730 may be used to give the groups of users (e.g., those created and stored in tblProfileUsers 720) a specific descriptive name and an ID. Finally, an alert log table (tblAlertLog) 745 may be used to store alerts, and may include a profile ID and rule ID for each alert, as well as information on when each alert was sent.

FIG. 2 illustrates an example method 200 for providing information from other applications to electronic devices, according to one embodiment. In a checking process 205 of the example method, here, the log monitor checks the third party log files (e.g., from the third party applications) for any new log entries. In communication process 210, if there are any new log entries, information about these new log entries may then be sent to the rules engine 115. In 215, a process of determining whether or not any of the new log entries violate any rules in the rules engine 115 may be performed. In 220, the alert engine 120 may create alerts. In 225, the alerts can be added to an alert queue and sent.

FIG. 3 illustrates an example process 205 for checking third party log files, according to one embodiment. Referring to FIG. 3, various details of the checking process 205 of FIG. 2 are shown. First, a monitoring process 305 may be performed, wherein the log monitor 113 may periodically monitor the third party log file 105 to see if any new log entries have appeared. Next, at an appointed time period, interval or other trigger, a determination process 310 may be performed, wherein the log monitor 113 determines if any new log entries have been found. Here, for example, the log monitor 113 may be configured to scan the most recent entry in the third party log file 105 and compare the date and time of that entry against the date and time of the last entry found, which may be stored in memory. If no date and time is found in memory, the date and time of the log entry may be written to memory and the entry may then be passed to the rules engine 115. If the date and time of the most recent entry is after the date and time of the last entry found, this indicates that a new log entry has been found and that date and time may then be written to memory over the previous date and time.

If, at 310, the log monitor confirms that a new log entry has been found, the new log entry information may then be sent to the rules engine 115 for processing. If, at 310, the log monitor confirms that no new log entry has been found, the process may return to 305, where the log monitor 113 may wait for the next time unit or other triggering event to check again for any new log entries.

Figure 4:
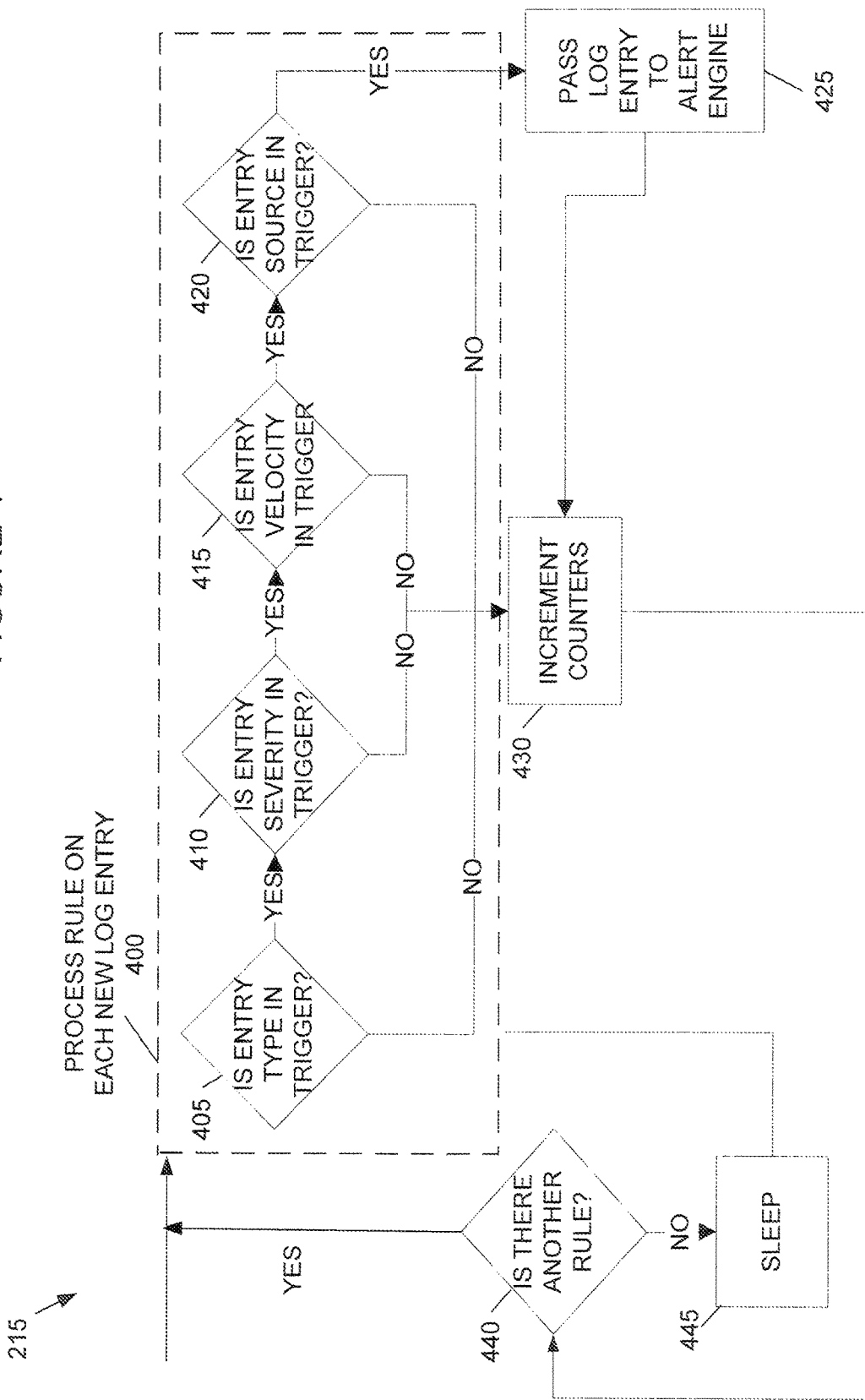
FIG. 4 illustrates an example communication process 215 for determining whether any rules have been violated, according to one embodiment.

FIG. 4 illustrates details relating to process 215, to determine if any rules have been violated, according to one embodiment. Upon receipt of a new log entry, the rules engine 115 may process an active rule on each new log entry in 400 to see if it violates the active rule (e.g., beginning with the first rule in a rules queue). The processing of the rules may also take into account filtration criteria. In one embodiment, the filtration criteria may include, but are not limited to: type of event, severity of event, velocity of event, source of event, or any combination thereof. Additional features of these exemplary filtration criteria are discussed with respect to actions 405-420, below. Note that depending upon the specific embodiment in question, some or all of the exemplary filtration criteria in 405-420 may be included. In other embodiments, other filtration criteria, in addition to or instead of the filtration criteria in 405-420, may be utilized. The filtration criteria may include, but are not limited to: time of day; type of event (e.g., unauthorized attempt) number of events (e.g., more than 5); number of events within a certain time period (e.g., more than 5 within 5 minutes); key words found in alert; or severity of alert; or any combination thereof (e.g. more than 5 SQL injection attempts within 1 hour from a single source).

In 405, the rules engine 115 may determine whether the type of the log entry is defined as a trigger. In some embodiments, the rules, which may define each of the triggered types, may be configured by a user of alert system 103 through the setup and maintenance screens 135. In one embodiment, the third party application that creates the third party log file 105 defines the type of the log entry. For example, if the third party log file 105 is created by a web server application firewall, there may be various types of entries in the log file (e.g., SQL injection, cross-site scripting, web crawler). By way of illustration and not limitation, a user may select SQL injection and cross-site scripting types as a trigger in a rule, but may not select the web crawler type. In this illustration, the SQL injection and cross-site scripting types would exist in the rules table 130 and therefore both entry types would be in the trigger. If the trigger determination routine confirms that the log entry type is not a trigger, the communication process may proceed directly to 420. If, however, the log entry type is found to be a trigger, then the communication process may proceed to one or more trigger routines, beginning at 410.

In 410, the rules engine 115 may be configured to determine whether the severity of the subject log entry is defined as a trigger. In some embodiments, a third party application may include a severity field in their third party log file 105. Here, for example, this severity field may indicate the relative importance of each log entry in the third party log file 105. The third party application that creates the third party log file 105 may also define the severity scale. In one example implementation, a web server application firewall may define severity on a scale of 1 to 5 (e.g., 1 being the least severe and 5 being the most severe). The rule may then define as a trigger a log entry with a severity of 5. The rules engine then compares the severity defined by the rule to the severity in the log entry to determine if the severity is a trigger. If the rules engine determines that the log entry severity is not a trigger, the process may precede to an increment counter routine 430. If, however, the rules engine determines that the log entry severity is a trigger, the process may proceed to 415.

In 415, the rules engine 115 may determine whether the velocity (e.g., frequency) of the log entry is defined as a trigger. Here, velocity may be the frequency that a type of log entry occurs. In one embodiment, velocity may be measured as a number per time period (e.g., minute, hour, day, week, month, year), though it may also be based on other periodic measures. According to some implementations, for example, the rule might define the velocity frequency trigger for a SQL injection type in a web application firewall as 5 times per hour. As such, the rules engine 115 may be configured to compare the frequency defined in the rule against the increment counter variable to determine if the log entry velocity is a trigger. If, at 415, the rules engine determines that the log entry velocity is not a trigger, the process may proceed to the increment counter routine 430. If yes, the log entry velocity is a trigger, the process may move to 420. In some embodiments, if desired, the filtering criteria (e.g., 405-420) may be modified to create a custom filtration profile for each of several users.

In 420, the rules engine 115 may be configured to determine whether the source of the log entry is defined as a trigger. Here, the third party application that creates the third party log file 105 may also define the source. For example, if the third party log file 105 is created by a web server application firewall, there may be a source IP address that gets logged with each log entry (e.g., 192.168.0.76). The rule may select an IP address of 204.234.23.2 as the source. The rules engine 115 may then compare the source defined in the rule against the source in the log entry. If the sources match, the source entry is a trigger. If, at 420, the rules engine determines that the log entry source is not a trigger, the process may proceed to the increment counter routine 430. If, however, the rules engine determines that the log entry source is a trigger, the process may proceed to a transmit alert routine 425.

According to an illustrative transmit alert routine 425, information regarding any new log entries that have been filtered by the rules with the filtration criteria, which the rules engine 115 has determined should be passed to the alert engine 120, may now be passed to the alert engine 120. In 430, the increment counter routine may update the increment counter with information on whether any new log entry did or did not meet certain filtration criteria. In some embodiments, the increment counter may be a multi-dimensional incremental counter, which may store information about which of the multiple criteria each new log entry met. Here, for example, the increment counter may store information regarding whether or not each new log entry met the filtration criteria of type, source, severity and/or velocity, etc.

Once the increment counter routine is complete, in 440, it can be determined whether other rules exist that need to be processed. If, at 440, it is determined that the end of the rule collection has not been reached, the process may return to 400 (e.g., additional filtration criteria, such as criteria in addition to that filtration criteria discussed in 405-420). If the end of rule collection has been reached, such that the new log entry does not need to be checked against additional rules, the process may proceed to 445 where the rules engine 115 may return to sleep mode.

Figure 5:
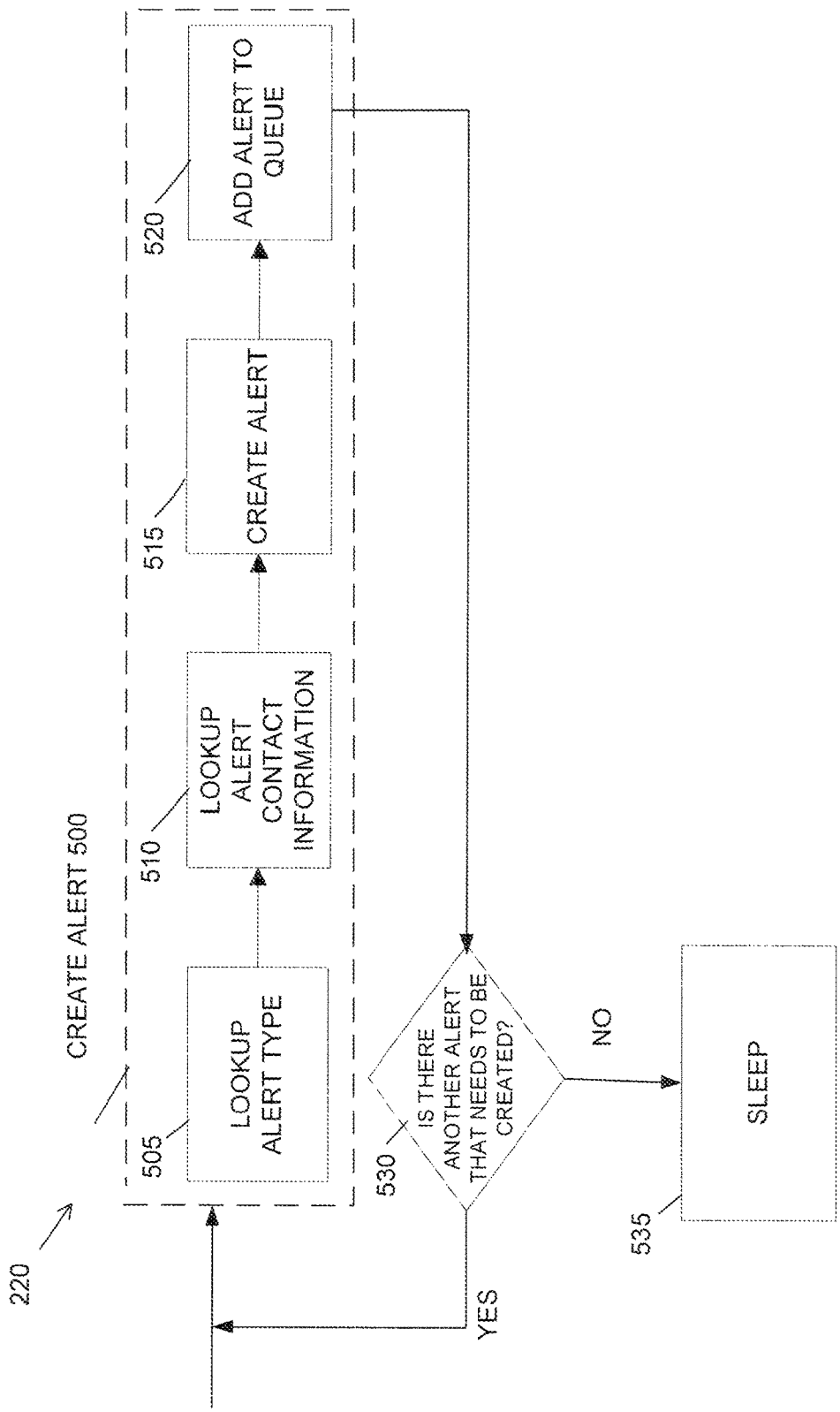
FIG. 5 illustrates an example alert creation/addition process 220 for creating/adding alerts to an alert queue if rules have been violated, according to one embodiment.

FIG. 5 illustrates an example alert creation/addition process 220 for creating alerts and/or adding alerts to an alert queue if rules have been violated, according to one embodiment. Referring to FIG. 5, various details of an example alert creation/addition process 220 are shown, including features wherein, if the rules engine 115 has determined that information about a new log entry should be sent to the alert engine 120, the alert engine 120 may create alerts and/or add alerts to an alert queue. In 500, when the alert engine 120 receives a new log entry from the rules engine 115, an alert can be created (e.g., utilizing 505-520, explained below).

In a first lookup routine 505, the alert type of the new log entry may be looked up by the alert engine 220, which may check the new log entry against each active alert to determine which active alert(s) (e.g., email message, text message, page, cell phone call, etc.) are appropriate for the new log entry (e.g., tblalertlog 745 may be used to find the alert log ID, the profile ID, and the rule ID; tblrules 715 may be used to find the profile ID, the frequency ID, and a rules description; and tblfrequency 710 may be used to find the frequency ID, the frequency occurrence, and the frequency conditions). Next, in a second lookup routine 510, the contact information (e.g., email address, cell phone number, pager number, etc.) listed for the alert type may be found by searching database 130 (e.g., tblprofileusers 720, tbleuserprofiles 705, and tblprofiles 730 may be used to find the user ID and the profile ID, which can both be used to find the necessary contact information). After such lookup, according to an alert creation routine 515, an alert may be created by utilizing the information from the new log entry with the appropriate contact information. Additionally, in an add alert routine 520, the alert may be added to the alert queue. At 530, an end of collection check is performed to see if additional alerts need to be created. If additional alerts need to be created, the process may return to 505. If the end has been reached, and additional alerts do not need to be created, the alert engine 120 may return to sleep mode in 535.

Figure 6:
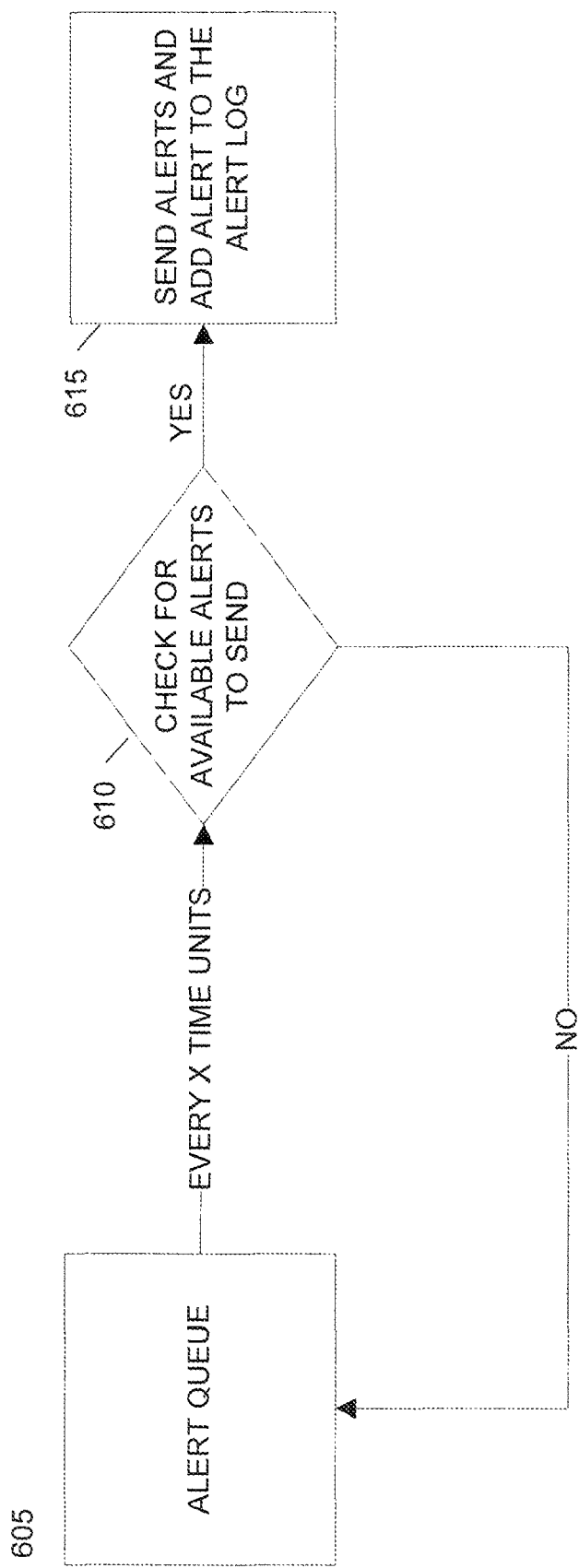
FIG. 6 illustrates an example process 225 for an alert processor to check the alert queue for available alerts and send the alerts, according to one embodiment.

FIG. 6 illustrates an example alert checking and sending process 225 wherein an alert processor may check the alert queue for available alerts and send any available alerts, according to one embodiment. Referring to FIG. 6, various details of an example alert checking routine 225, wherein an alert processor 125 may check an alert queue for available alerts and/or send such alerts, are shown. In a checking routine 610, the alert processor 125 may check the alert queue 605 every X time units for available alerts that need to be sent. (Note that X may be a time unit or interval configured by the user and/or determined by a computer.)

An available alert may be an alert in the alert queue where certain pre-defined conditions (e.g., alert rules and roles) have been met such that the alert is considered "available" to be sent. For example, certain individuals or groups of individuals based on names (e.g., John Smith, Jane Smith, etc.), roles (e.g., user, administrator, data security specialist, web master, business executive), or pre-defined groups (e.g., production support team, web development team, marketing department, management team, auditors) can be sent certain alerts based on various criteria.

Examples of alerts based on various pre-defined criteria include, but are not limited to: pre-defined "on" hours when the at least one alert may be sent to certain individuals (e.g., the normal user of the computer may be sent an alert from 9 AM-5 PM local time, and a back-up administrator can be sent an alert between 5:01 PM and 8:59 AM local time); certain individuals may only be sent an alert after a pre-defined number of unauthorized attempts to access a system have been made (e.g., within a certain pre-defined time period); certain individuals may be sent an alert based on the subject matter of the at least one alert (e.g., the normal user of the computer may be sent alerts with the key words "unauthorized access attempt", and a back-up administrator may be sent alerts with the key word "unauthorized data changes"); certain individuals may be sent an alert based on the severity level of the alert (e.g., the normal user of the computer may be sent alerts that are low, moderate, and severe, but the back-up administrator may only be sent alerts that are severe); business executives may be sent an alert above a certain severity if there are more than three in one day, but not notified after normal business hours; or data security specialists may be sent an alert at any time of day of severity 3 events if there are more than three such events per hour; or any combination thereof.

If an available alert is found, in 615, the alert processor 125 may send the alert and log the alert in the database 130. If no available alerts are found, the processor may wait for the next X time units to check again.

The ability to generate an alert has been described above. The alert may also provide the ability perform certain functions, as discussed below with respect to FIGS. 12-14.

Figure 12:
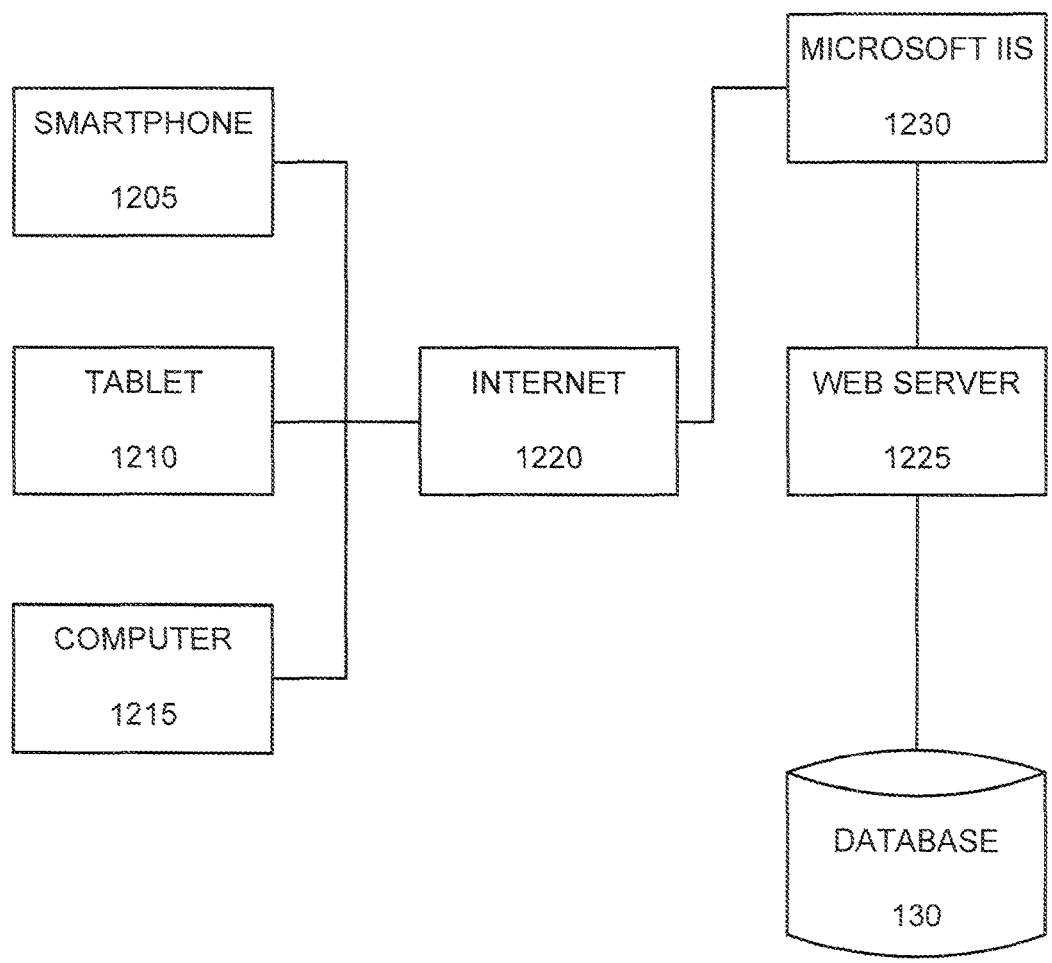
FIG. 12 illustrates a blocking mechanism for blocking source IP addresses, according to one embodiment.

FIG. 12 illustrates a blocking mechanism for blocking source IP addresses (e.g., from malicious and/or compromised computers) by accessing a hyperlink, according to embodiments of the invention. (A source IP address is the address of a source computer (e.g., sending an email or attempting to access another computer) connected to an IP network.) The hyperlink may be accessed via a smartphone 1205, tablet 1210, or other computer 1215, or any other device with access to a network (e.g., the Internet 1220). The hyperlink may be a uniform resource locator (URL). A web server 1225 may decode information stored in the URL and look up information in the database 130. An application programming interface (API) 1230 (e.g., web server Microsoft Internet Information Services (ISS)) may then be accessed to perform a function (e.g., block an IP address).

The URL may be unencrypted or encrypted. The URL may contain many types of information. For example, in an embodiment, the URL may contain an alert ID and/or a source IP address. The alert ID and/or source IP address may be encrypted or unencrypted, and may be stored in database 130. The alert ID may also include many other types of information, comprising: computer control information (e.g., turn on the PCs screen saver with a password, power off the PC), information on reports/graphs (e.g., pull and display report/graphs), firewall information (e.g., change the security levels (e.g., low, medium, high)).

FIG. 13 illustrates an example blocking mechanism, according to an embodiment. In 1305, the user may receive an alert (e.g., a report) comprising a URL incorporating a source IP address, and access (e.g., clicks on) the URL and source IP address (e.g., www.mysite.com/servicename/1DFGRR452XXX). In 1310, the browser may connect to the web server 1225. In 1315, the web server 1225 (e.g., using a web service) may intercept the URL link and decrypt one or more pieces of the URL (e.g., 1DFGRR452XXX) to discover the source IP address (e.g., 192.168.1.1). In 1320, the web server 1225 may call the API 1230 (e.g., Microsoft IIS) to enable execution of a function that blocks a source IP address on the web server by passing the source IP address as a parameter to the function to execute a command to block the source IP address.

FIG. 14 illustrates an example mechanism that uses an alert to perform a function(s), according to an embodiment. In 1405, the user may access (e.g., clicks on) a URL that incorporates information about an alert (e.g., www.mysite.com/servicename/1DFGRR452XXX). In 1410, the browser may connect to the web server 1225. In 1415, the web server 1225 (e.g., using a web service) may intercept the URL link and decrypt one or more pieces of the URL (e.g., 1DFGRR452XXX) to discover an alert ID (e.g., 1101). In 1420, the web server 1225 may run a SQL statement against a database 130 to look up information stored related to the alert ID. For example, the alert ID may store information related to blocking the source IP address (e.g., Select Source IP from tblalertlog where alertID=1101). In 1425, the SQL statement may return the information stored related to the alert ID. For example, the source IP address (e.g., 192.168.1.1) may be returned. In 1430, the web server 1225 may call the API 1230 (e.g., Microsoft IIS) to execute any functions stored for the alert ID. For example, a function may be executed that blocks a source IP address on the web server by passing the source IP address as a parameter to the function to execute a command to block the source IP address. As another example, graph and/or report information may be displayed.

EXAMPLES

Several example embodiments are set forth below. However, many other embodiments are also possible.

Firewall Example

In one example, the alert system 103 may run on a web server alongside a pre-existing web firewall. In the event of an intrusion attempt into the web site hosted on the web server, the pre-existing third-party firewall would typically block the intrusion attempt and write an entry to its third party log file 105. Referring to FIG. 3 above, in 305, the alert system 103 may monitor the third party file 105. In 310, the alert system 103 would determine that a new log entry had been added: the blocking of the intrusion attempt. The blocking of the intrusion attempt log entry would be sent to rules engine 115. As set forth in FIG. 4, in 400 the first rule would be processed, using, for example, pre-set criteria (e.g., similar to, but not limited by, 405-420 in FIG. 4). If the blocking of the intrusion attempt log entry file met all of the filtering criteria, an instant alert would be sent (e.g., via email or cellular phone text message) to intended recipients, following the procedures set forth in FIGS. 5 and 6.

In the above manner, real-time alerts may be provided to users. In this way, users do not need to be logged online to the firewall when an intrusion attempt occurs, nor do users need to review past log files after an intrusion attempt has occurred, to discover an intrusion attempt. A user may thus take action (e.g., block all access from the intruder's IP address, shut down the user's web site until the threat has passed) to stop an intruder or potential intruder before the intruder or potential intruder has the opportunity to attempt many types and variants of penetrations (e.g., which may eventually be successful if given enough time).

In some embodiments, the alert system 103 may allow a user to customize the notifications. For example, a small business owner may want to be notified of all attempts during, business hours, but during non-business hours, the small business owner may want to have the web master notified only of any instance of more than ten attempts within five minutes by a single source (or address). As another example, a home user may want to be notified only of attempts: exceeding a certain frequency, by time of day, or by severity, or any combination thereof.

Parental Control Example

In another example, the alert system 103 may run alongside a parental control application. In the event of an unauthorized attempt to access an unauthorized web site, the parental control application would typically block the unauthorized web site and write an entry to its third party log file 105. Referring to FIG. 3 above, in 305, the alert system 103 may monitor the third party file 105. In 310, the alert system 103 would determine that a new log entry had been added: the blocking of the unauthorized web site. The blocking of the unauthorized web site log entry would be sent to rules engine 115. As set forth in FIG. 4, in 400 the first rule would be processed, using, for example, pre-set criteria (e.g., similar to, but not limited by, 405-420 in FIG. 4). If the blocking of the unauthorized web site met all of the filtering criteria, an instant alert would be sent (e.g., via email or cellular phone text message) to intended recipients, following the procedures set forth in FIGS. 5 and 6.

In the above manner, real-time alerts may be provided to parents (or guardians, or caretakers, school administrators, teachers, etc.). In this way, parents do not need to be logged online to the firewall when an intrusion attempt occurs, nor do parents need to review past log files after an intrusion attempt has occurred, to discover an intrusion attempt.

In some embodiments, the alert system 103 may allow a parent to customize the notifications. For example, a parent may select to only be notified of a number of repeated attempts within a certain timeframe, or by severity, as defined by specific types of web sites. So, for example, a parent could be notified instantly of three or more attempts to enter adult web sites within a certain timeframe (such as three or more attempts in a day), but a fewer number of attempts to access social media websites after midnight.

ATM Example

In another example, the alert system 103 may run alongside a standard WINDOWS application as well as an entity's proprietary application. For example, ATM machines may be driven by on-board WINDOWS-based personal computers (PCs), along with the ATM manufacturer's proprietary software. The log files from the WINDOWS software and the proprietary software may include: hardware failures, software events, currency status, receipt paper supply, number and dollars of withdrawals and deposits, etc.

In the event of, for example, cash being low, the proprietary application could write an entry to its third party log file 105. Referring to FIG. 3 above, in 305, the alert system 103 may monitor the third party file 105. In 310, the alert system 103 would determine that a new log entry had been added: the cash being low. The low cash log entry would be sent to rules engine 115. As set forth in FIG. 4, in 400 the first rule would be processed, using, for example, pre-set criteria (e.g., similar to, but not limited by, 405-420 in FIG. 4). If the low cash log entry met all of the filtering criteria, an instant alert would be sent (e.g., via email or cellular phone text message) to intended recipients, following the procedures set forth in FIGS. 5 and 6.

In some embodiments, the alert system 103 may allow customized notifications. For example, the alert system 103 might notify one user when cash is getting low in the ATM, but another user of transaction volumes to be used for profitability calculations.

In this specification, "a" and "an" and similar phrases are to be interpreted as "at least one" and "one or more." References to "an" embodiment in this disclosure are not necessarily to the same embodiment.

It should also be noted that the alert system 103 may comprise one or more computers. A computer may be any programmable machine capable of performing arithmetic and/or logical operations. In some embodiments, computers may comprise processors, memories, data storage devices, and/or other commonly known or novel components. These components may be connected physically or through network or wireless links. Computers may be referred to with terms that are commonly used by those of ordinary skill in the relevant arts, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e., hardware with a biological element) or a combination thereof, all of which are behaviorally equivalent. For example, modules may be implemented using computer hardware in combination with software routine(s) written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above described example embodiments.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

It should be noted that Applicant has, for consistency reasons, used the phrase "comprising" throughout the claims instead of "including, but not limited to". However, it should be noted that "comprising" should be interpreted as meaning "including, but not limited to".

In addition, it should be noted that, if not already set forth explicitly in the claims, the term "a" should be interpreted as "at least one" and "the", "said", etc. should be interpreted as "the at least one", "said at least one", etc.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method of making information from at least one application accessible to at least one electronic device, the method comprising:
   configuring at least one computing device to perform:
   checking, via at least one log monitor, at least one third party log file for at least one new log entry;
   sending any new log entries in the at least one third party log file to at least one rules engine, the at least one rules engine comprising at least one rule;
   determining if any of the new log entries violate any rules in the at least one rules engine;
   making accessible any new log entries that violate any rules to the at least one electronic device;
   creating at least one alert based on at least one new log entry that violates at least one rule, the alert providing access to functionality for addressing at least one rule violation for the new log entries that have been made accessible; and
   automatically notifying users of the at least one alert, using alert criteria to determine who should receive the alerts and when, wherein different users receive different alerts based on the alert criteria;
   wherein the alert criteria comprises at least one of the following: time of day, type of event as characterized by the at least one rule, number of events, number of events within a certain time period, key words found in the alert, and severity of the alert;
   the alert providing access to functionality including, within the alert, a hyperlink encoded with data indicating at least one source IP address, which can be retrieved and blocked on the web server by passing the IP address as a parameter of an application interface (API) call.

2. The method of claim 1, further comprising:
   creating at least one alert queue, the at least one alert queue comprising at least one alert;
   checking the at least one alert queue for available alerts, the available alerts determined by the alert criteria; and
   making accessible any available alerts to the at least one electronic device.

3. The method of claim 1, wherein the alert criteria comprise: at least one pre-defined individual and/or at least one pre-defined group of individuals.

4. The method of claim 3, wherein the alert criteria comprise: names; roles; or pre-defined groups; or any combination thereof.

5. The method of claim 1, wherein the at least one third party application comprises:
   at least one firewall application;
   at least one parental control application;
   at least one proprietary application; or
   at least one WINDOWS application;
   or any combination thereof.

6. The method of claim 1, further comprising:
   accessing information in the at least one alert; and
   performing at least one function based on the at least one alert.

7. The method of claim 6, wherein the information in the at least one alert comprises: instructions to block a source IP address; computer control information; graph/report information; or firewall information; or any combination thereof.

8. The method of claim 1, further comprising:
   blocking at least one source IP address so that the at least one source IP address is unable to access at least one web server.

9. The method of claim 1, wherein the alert criteria further comprise allowing the at least one alert to be sent to at least on individual only when the at least one alert is determined to be above a pre-defined severity level.

10. The method of claim 1, wherein the alert criteria additionally comprises at least one of the following:
    allowing the at least one alert to be sent to at least one individual during pre-defined "on" hours and/or allowing the at least one alert to be sent to at least one individual during pre-defined "off" hours;
    allowing the at least one alert to be sent to at least one individual after at least one pre-defined number of attempts;
    allowing the at least one alert to be sent to at least one individual based on the subject matter of the at least one alert; and
    allowing the at least one alert to be sent to at least one individual after at least one pre-defined number of attempts in a pre-defined time period.

11. A system of making information from at least one application accessible to at least one electronic device, the system comprising:
    at least one hardware processor configured for:
    checking, via at least one log monitor, at least one third party log file for at least one new log entry;
    sending any new log entries in the at least one third party log file to at least one rules engine, the at least one rules engine comprising at least one rule;
    determining if any of the new log entries violate any rules in the at least one rules engine;
    making accessible any new log entries that violate any rules to the at least one electronic device;

creating at least one alert based on at least one new log entry that violates at least one rule, the alert providing access to functionality for addressing at least one rule violation for the new log entries that have been made accessible; and automatically notifying users of the at least one alert, using alert criteria to determine who should receive the alerts and when, wherein different users receive different alerts based on the alert criteria;

wherein the alert criteria comprises at least one of the following: time of day, type of event as characterized by the at least one rule, number of events, number of events within a certain time period, key words found in the alert, and severity of the alert;

the alert providing access to functionality including, within the alert, a hyperlink encoded with data indicating at least one source IP address, which can be retrieved and blocked on the web server by passing the IP address as a parameter of an application interface (API) call.

12. The system of claim 11, wherein the at least one processor is further configured for:

creating at least one alert queue, the at least one alert queue comprising at least one alert;

checking the at least one alert queue for available alerts, the available alerts determined by the alert criteria; and making accessible any available alerts to the at least one electronic device.

13. The system of claim 11, wherein the alert criteria comprise: at least one pre-defined individual and/or at least one pre-defined group of individuals.

14. The system of claim 13, wherein the alert criteria comprise: names;

roles; or pre-defined groups; or any combination thereof.

15. The system of claim 11, wherein the at least one third party application comprises:

at least one firewall application;
at least one parental control application;
at least one proprietary application; or
at least one WINDOWS application;
or any combination thereof.

16. The system of claim 11, wherein the processor is further configured for:

accessing information in the at least one alert; and
performing at least one function based on the at least one alert.

17. The system of claim 16, wherein the information in the at least one alert comprises: instructions to block a source IP address; computer control information; graph/report information; or firewall information; or any combination thereof.

18. The system of claim 11, wherein the processor is further configured for:

blocking at least one source IP address so that the at least one source IP address is unable to access at least one web server.

19. The system of claim 11, wherein the alert criteria further comprise allowing the at least one alert to be sent to at least on individual only when the at least one alert is determined to be above a pre-defined severity level.

20. The system of claim 11, wherein the alert criteria additionally comprises at least one of the following:

allowing the at least one alert to be sent to at least one individual during pre-defined "on" hours and/or allowing the at least one alert to be sent to at least one individual during pre-defined "off" hours;

allowing the at least one alert to be sent to at least one individual after at least one pre-defined number of attempts;

allowing the at least one alert to be sent to at least one individual based on the subject matter of the at least one alert; and allowing the at least one alert to be sent to at least one individual after at least one pre-defined number of attempts in a pre-defined time period.

* * * * *